United States Patent [19]

Mebus

[11] 3,873,422
[45] Mar. 25, 1975

[54] VACCINE FOR NEONATAL CALF DIARRHEA

[75] Inventor: Charles A. Mebus, Lincoln, Nebr.

[73] Assignee: The Board of Regents of the University of Nebraska, Lincoln, Nebr.

[22] Filed: Oct. 12, 1973

[21] Appl. No.: 405,997

Related U.S. Application Data

[63] Continuation-in-part of Ser. No. 302,179, Oct. 30, 1972, abandoned.

[52] U.S. Cl. ..................... 195/1.3, 195/1.1, 424/89
[51] Int. Cl. ........................... C12k 5/00, C12k 7/00
[58] Field of Search ........................ 195/1.3; 424/89

[56] References Cited
OTHER PUBLICATIONS

Mebus et al., Vet. Path. 11:375 (1973).
Mebus et al., Amer. J. Vet. Res. 34:145–150 (1973).
Stair et al., Amer. J. Vet. Res. 33: 1147–1155 (1972).
Mebus et al., Vet. Med/Small Anim. Clin. 67:173–178 (1972).
Mebus et al., Can. Vet. Journal, 12:69–72 (1971).
Welch Canad. J. Comp. Med. 35:195–202 (1971).
Mebus et al., Proc. 73rd Ann. Mtg. U.S. Animal Health Assn., pp. 97–99 Oct. 12–17, 1969.
Mebus et al., Univ. Nebraska Coll. Agric. Home Econ. Res. Bull. 233, Mar. 1969.

*Primary Examiner*—Shep K. Rose
*Attorney, Agent, or Firm*—Alan D. Lourie; William H. Edgerton

[57] ABSTRACT

A vaccine is prepared by passaging a coronavirus-like agent in tissue culture or by inactivating the viral agent. The vaccine is useful for immunizing bovine animals against calf diarrhea.

4 Claims, No Drawings

VACCINE FOR NEONATAL CALF DIARRHEA

This application is a continuation-in-part of copending Ser. No. 302,179, filed Oct. 30, 1972 now abandoned.

The present invention relates to a vaccine against a new coronavirus-like agent which is a causative factor in neonatal calf diarrhea and to a method of obtaining said vaccine. In particular, the invention consists of a method of attenuating the coronavirus-like virus by serial passage in fetal bovine kidney cells and to the vaccine obtained thereby. In addition, a vaccine is prepared by inactivating the coronavirus-like agent after it is propagated on cell cultures.

BACKGROUND AND IDENTIFICATION OF THE CORONAVIRUS-LIKE AGENT

The etiologic factors of neonatal calf diarrhea (NCD) are complex. Numerous organisms have been implicated as causes for this disease, including bacteria, fungi, mycoplasma, chlamydia, and viruses. Viruses specifically enumerated have been bovine viral diarrhea, infectious bovine rhinotracheitis, adenovirus, enterovirus, and HADEN virus. Other viruses that have been reported as etiologic agents of NCD are calf pneumonia enteritis virus and a reovirus-like agent referred to as NCD virus. The method of preparing a vaccine effective against this NCD reovirus-like agent is disclosed and claimed in application Ser. No. 197,520, filed Nov. 10, 1971.

In the course of field trials of the vaccine prepared from the reovirus-like agent, it was observed that in certain herds in western Nebraska inadequate control of the calf disease resulted. [Vet. Med./Small Anim. Clin., 67(2), 173 (1972)]. Typically, the calves had received the vaccine during the first 24 hours of life, yet diarrheas developed in several herds when the calves were 5 to 20 days old. Diarrheal feces from these calves were examined for the reovirus-like virus using the fluorescent antibody technique and were found negative.

Diarrheal feces from one of the vaccinated herds in which 90 per cent of the calves were affected when they were 7–12 days old were inoculated via duodenal injection into a Caesarean derived colostrum-deprived calf. This calf developed diarrhea from which bacteria-free fecal filtrates were prepared and inoculated orally into gnotobiotic calves. These calves developed diarrhea, thereby indicating another viral agent as the cause of diarrhea. Electron microscopic examination of diarrheal feces from the experimental calves revealed a coronavirus-like agent. Similar viral particles were found in diarrheal feces both in vaccinated herds participating in the field trials and in herds in which no vaccine had been used.

This new coronavirus-like agent has now been purified and identified in greater detail. We have discovered that this corona-like virus can be propagated and modified on cell cultures into an effective vaccine. We have also discovered that an effective vaccine can be prepared by inactivating the virus after it has been grown on cell cultures. Therefore, our invention consists of vaccines effective against this new coronavirus-like agent and of methods of preparing and administering this vaccine. Purification and description of this agent have now been described in *Am. J. Vet. Res.* 33, 1147-56 (1972).

Purification of the Coronavirus-like Agent

Samples of fecal material were collected from diarrheal calves of 19 ranch herds in western Nebraska. Calves from 12 of the 19 herds had been previously inoculated orally with NCD reovirus-like virus vaccine while calves from the remaining herds were unvaccinated. Fecal smears from diarrheal calves were stained with an immunofluorescent conjugate to test for NCD virus (Univ. of Nebraska, Agri. Exper. Sta. Res. Bull. 233, 1969) and only samples negative for NCD virus were used. Diarrheal fecal material collected from naturally infected calves in the field and from experimentally infected calves was frozen immediately and stored at −20° to −60°C until viral purification was begun.

Sucrose density gradients were prepared and allowed to stand overnight at 4°C in order to form a linear gradient before use. Gradients consisted of 8 ml each of 400, 300, 200 and 100 mg of sucrose per milliliter of distilled deionized water. Decreasing concentrations were layered into 2.5 by 8.9 cm cellulose nitrate centrifuge tubes.

All procedures leading to viral purification were conducted at 4°C. A clinical centrifuge and an ultracentrifuge were used.

The diarrheal fecal material was mixed with three volumes of deionized water and centrifuged at 5,000 g for 30 minutes. The supernate was then centrifuged for 3 hours at 25,000 rpm in a type 30 rotor. The resultant pellet was dispersed by sonification for 30 seconds in 5% (w/v) sucrose solution. The suspension will be referred to as the crude viral suspension.

Crude viral suspension (5 ml) was layered on the gradients in the tubes and centrifuged at 25,000 rpm for 2 hours in a SW 27 rotor. After centrifugation, bands were located by light scattering. Material from each band was collected from the top of the centrifuge tube using a Pasteur pipet fitted with a propipette. Samples were dialyzed against 1% solution of ammonium acetate before electron microscopy was done. The fraction containing virus (semipurified virus from the band that was 6 cm from the meniscus) was submitted to further purification by sucrose density gradient centrifugation or by cesium chloride (CsCl) gradient centrifugation.

The semipurified virus preparation was purified further by repeating the sucrose density gradient centrifugation process described above. Again bands were located and the band at 6.0 cm from the meniscus was collected and dialyzed against 1% ammonium acetate to yield a purified virus.

Isopycnic gradient centrifugations of the semipurified virus preparation with CsCl were conducted by starting with a 30% solution (15 Gm of CsCl plus 35 ml of deionized water). This solution (4 ml) was placed in cellulose nitrate centrifuge tubes, and each tube was overlayed with 1.4 ml of viral suspension. A SW 65 rotor was used at 60,000 rpm for 18 hours, at which time apparent equilibrium had been reached. The refractive index of the CsCl in the zone where the virus was located was determined using a TS meter. The band at 2.9 cm from the meniscus was collected and dialyzed against 1% ammonium acetate solution to give a purified virus.

The aforementioned crude viral suspension (15 ml) was also fractionated by gel filtration on a 4.2 by 42 cm gel column (Sepharose 2B, Pharmacia Fine Chemicals, Inc., Piscataway, N.J.). The column had been previously equilibrated with 0.9% NaCl and was developed with this salt solution. A flow rate of 6.0 ml/hour was used. Fractions of 5 ml were collected, and the absorbance was determined at 260 $\mu$m with a spectrophotometer. Materials from each of the different peaks were combined and separately concentrated by ultrafiltration.

A simplified procedure was also used for preparation of virus from diarrheal fecal material from experimental calves. The fecal material was centrifuged directly at 3,400 g for 30 minutes. A portion of the supernatant material was extracted twice with dichlorodifluoromethane. Aqueous phase (5 ml) and untreated supernatant (5 ml) material were subjected to sucrose density gradient centrifugation as previously described.

The virus concentrated by density gradient centrifugation was used for electron microscopic studies and also as an antigen for rabbit immunization to prepare a conjugate for immunofluorescent analysis. White domestic rabbits about 6 months old were bled from the heart (14 ml) and then injected intramuscularly at four sites with 0.25 ml per site of a mixture of 0.4 ml antigen and 0.6 ml complete Freund's adjuvant. Five weeks after inoculation 70 ml of blood were collected by cardiac puncture. Fluorescein labeled gamma globulin was prepared from the post inoculation serum by known methods (*Proc. U.S. Livestock San. Assn.*, Oct. 1968, 139–144).

The presence of the coronavirus-like agent could be detected in infected intestine by the immunofluorescent technique using the conjugate prepared above. The specificity of this conjugate for the coronavirus-like agent was clearly shown in the following series of tests. Sections of intestine from diarrheic calves which had been infected with coronavirus-like agent were stained with the conjugate and fluorescence of the villous cells was observed. Intestine from the same calf had no fluorescence when stained with the conjugate for the reovirus-like agent referred to above. Sections of intestine from diarrheic calves which had been infected with the reovirus-like virus were positive when stained with conjugate for the reovirus-like agent and negative when stained with the conjugate for the coronavirus-like agent. Sections of a normal gnotobiotic calf intestine had no fluorescence when stained with the conjugate for the coronavirus-like agent. Sections of a normal gnotobiotic calf intestine had no fluorescence when stained with the conjugate for the coronavirus-like agent.

Morphology of the Virus

The virus-containing band resulting from gradient density ultracentrifugation purification was examined by electron microscopic examination. Droplets from the bands were applied to 200 mesh copper grids which had previously been coated with collodion and reinforced with evaporated carbon. The droplets were allowed to remain on the grids for 3 to 25 minutes depending on the degree of light scattering of the band that was being studied. Excess fluid was blotted off with filter paper and then a droplet of vanadatomolybdate-phosphotungstic acid solution was applied to the grid. The stain was allowed to remain on the grid for 1 to 1.5 minutes before the excess was removed by using filter paper as a blotter.

The samples were examined with an electron microscope with an instrument magnification of 32,000 or greater. Size determinations were made by dimensional analysis of electron micrographs of the specimens and diffraction grating replicas which were taken immediately after the specimen electron micrographs without altering the settings of the instrument.

Size of complete viral particles ranged from 107 to 160 $\mu$m in the same micrograph and had surface projections similar to those observed for the coronaviruses. Average size of particles, including surface projections, as determined by electron microscopy, was 126 $\mu$m. The nucleocapsid was polymorphic and varied in size and shape from round to oblong. Envelopes of nucleocapsids were particularly obvious when the fringe was lost. Fringe width was variable to a maximum of 23 $\mu$m. Surface projections of well-preserved particles were petal shaped, attached to the particle by a slender stalk, and an average of 11 $\mu$m in length.

The coronavirus-like agent described in this invention is easily differentiated on the basis of size and morphological features from other viruses that have been proved or proposed to be an etiologic factor in neonatal calf diarrhea. The coronavirus-like agent herein described has different morphologic features and is larger than enteroviruses, the virus of calf-pneumonia-enteritis, bovine viral diarrhea, neonatal calf diarrhea virus (reo-like), and HADEN virus. This new agent is smaller and lacks the typical morphological features of infectious bovine rhinotracheitis virus. The buoyant density of purified coronavirus-like agent was 1.24 using CsCl while the reovirus-like agent had a buoyant density of 1.359 [*Can. J. Comp. Med.*, 35 (1971)].

The physiological effects of the coronavirus-like agent also differ from that of the reo-like virus. The incubation period following oral inoculation of gnotobiotic calves with the reovirus-like agent can be as short as 13.5 to 14 hours while the shortest incubation period observed with the coronavirus-like agent was 18 hours. In addition, reo-virus infected gnotobiotic calves have diarrhea for 5 to 8 hours and then appear normal 24 hours after the onset of diarrhea. On the other hand, coronavirus-like agent infected gnotobiotic calves develop diarrhea and may continue to have diarrhea 5 or more days or may die 2–3 days after diarrhea begins.

PREPARATION AND USE OF THE VACCINE

The following description illustrates methods useful in carrying out our invention; however, it is to be understood that these are not limitative.

The coronavirus-like agent obtained from infected calves and described herein was propagated on fetal bovine kidney cells. The virus may also be propagated on cells from other tissues or cell lines of bovine or other origin. Monolayer cell cultures are prepared by known methods and inoculated with the coronavirus-like agent. In general, monolayer cultures are washed with Hanks' balanced salt solution and then a viral inoculum is added and allowed to be absorbed for several hours, generally 2 hours, at about 37°. A maintenance medium of Earle's balanced salt solution containing 0.5% lactalbumin hydrolysate (LAH), 0.1% yeast extract, and 100 units penicillin and 200 $\mu$g streptomycin per milliliter is added and the culture is incubated at 30°–40°, preferably about 37°, for 2–10 days. The virus is harvested, e.g. by pouring off the supernatant fluid from the cells. The viral inoculum may be feces collected from coronavirus-infected calves or culture fluids from coronavirus-like virus cultures. The feces can be used as collected or can be diluted in phosphate buffered saline (pH 7.2 ), centrifuged at 1,000 g for 20 minutes and the supernatant fluid used as the inoculum.

Other maintenance media may be used, for example, modified Eagle's medium containing lactalbumin hydrolyzate. The choice of the medium is within the normal skill of the art.

An effective attenuated corona-like virus vaccine is obtained by passaging purified virus in fetal bovine kidney cells a sufficient number of times so that when an inoculated calf is challenged with virulent virus, no disease is produced. One will generally need to passage the virus from 5 to 60 times, the passages being in primary or secondary (primary cells which have been passaged once) cells or higher passaged cells or cell lines. Higher passaged cells which have been passaged more than 10 times may be considered cell lines. A preferred method involves a combination of passages on primary or secondary cells and higher passaged cells or cell lines. Virus titers are determined by standard methods. For example, cells inoculated with virus dilutions are incubated for 5 days in tubes containing fetal bovine kidney cells. The presence of virus is determined, e.g. by cytopathologic effects, immunofluorescence, or hemadsorption.

More specifically an effective attenuated vaccine was produced by the following procedure. A bovine fetus was obtained and a large quantity of primary kidney cells was prepared. Several bottles and coverslip cultures were prepared from the primary cells and the remainder of the primary cells were frozen using Earle's balanced salt solution containing 0.5% LAH, 10% adult bovine serum, and 10% dimethyl sulfoxide. The bottle and coverslip cultures were inoculated with viruscontaining solution as described herein and incubated at 37°C. When a few fluorescent cells were observed on the coverslip cultures some frozen primary cells from the same fetus were thawed and propagated into monolayer cultures by standard methods. Fluid from the infected primary cell culture was passed onto these secondary cell cultures. After incubation of 6–7 days, fluid from the secondary cell culture was used to inoculate additional secondary cell cultures. From the 1st through the 15th passage, 2 ml of the fluid was used to inoculate an 8 ounce bottle as described heretofore. From the 15th to 25th passage, 2 ml of the fluid was added to the maintenance medium in the bottle. After the 25th passage, a 1 ml inoculum is added to the maintenance medium in each bottle. When the coronavirus-like agent had reached the 5th to 20th tissue culture passage, a series of consecutive passages of cells from secondary cells was initiated. At each passage of the virus only part of the cells were infected and the other uninfected cells were subcultured to become the next higher passage level of cells. This type of cell culture is referred to as the passaged cell culture. By continuing the consecutive subcultural passages of the virus on passaged cell culture, a compatible cell-virus system was evolved. After 5–20 passages of the virus in secondary cell cultures the virus was passaged 5–40 or more times in passaged cell cultures to produce an effective attenuated coronavirus-like virus vaccine. The period of incubation for the viral passages decreases with increasing numbers of passages and can be from 2 to 7 days for passages on higher passaged cells or cell lines. Each passage is conducted until a cytopathogenic effect is obtained. The vaccine may be produced on a fetal bovine kidney cell line or from other tissues or cell lines of bovine or other origin, for example, bovine lung, a bovine turbinate cell line, or procine kidney cells or cell lines, by growing it in the tissue culture at about 37° until a suitable virus titer is obtained and then harvesting the virus. Titers of $10^2$ to $10^{6.5}$, preferably $10^4$ to $10^6$, are obtained. The vaccine may be used in the liquid state or lyophilized. It can be reconstituted with sterile diluent such as distilled water for later use.

The preferred product consists of an attenuated virus which has been passaged 12 times on secondary cells and 15 times on cells which themselves have been passaged nine to 27 times. The total passage level was thus 27. Vaccines of up to 35 passages have been prepared.

In addition, an effective inactivated vaccine is prepared by inactivating the coronavirus-like agent. In general, this is prepared by first propagating the agent on fetal bovine kidney cells as described above until an adequate titer is obtained. The titer should be as high as possible within the range stated above. Any cell passage level of virus, even an unattenuated virus, can be used. The virus is then inactivated by treating it at 20°–40° with an inactivating agent known in the art, such as formalin, $\beta$-propiolactone, ultraviolet radiation, or heat, for such a length of time and concentration of inactivating agent as to effectively inactivate the virus. These details are well known to the art. An adjuvant may be added to enhance the antigenicity. The adjuvant may be any of those known in the art including aluminum hydroxide gel, potassium alum, alginate, or an oil base or other adjuvant such as mineral or other organic oil.

A typical procedure to prepare an inactivated vaccine is as follows. The coronavirus-like agent at the 27th passage level as described above is used. Formalin is added to the virus-containing culture fluids until 0.2% concentration is obtained. These fluids are then allowed to stand for 1 to 2 days at 37°. To the inactivated virus is added aluminum hydroxide gel adjuvant to a concentration of 10%. The pH is adjusted to about 7.2 with aluminum hydroxide.

The attenuated vaccine can be administered orally in doses of 1 to 5 ml containing $10^2$ to $10^{6.5}$ TCID/ml to calves, preferably newborn, to induce immunity to virulent virus. The inactivated vaccine is administered parenterally in doses of 1 to 5 ml to pregnant cows 30–90 days prior to calving or to calves at an early age as soon after birth as possible, to provide protection from the coronavirus-like agent.

In addition, a combination vaccine can comprise coronavirus and any other viral agent, preferably inactivated, used to immunize calves or cows. A preferred combination includes inactivated coronavirus and reovirus, both of which are prepared by inactivating a live virus, either unattenuated or attenuated, by chemicals, radiation, or heat. Coronavirus can also be combined with bovine adenovirus, bovine virus diarrhea, or other bovine pathogen such as *E. coli* or *clostridia sp.*

A combination vaccine containing coronavirus and reovirus is prepared by mixing equal amounts of both inactivated agents. One then adds formalin to a concentration of 0.2% and aluminum hydroxide gel to 10% by volume. The dosage of this vaccine is 1 to 5 ml administered parenterally to the pregnant cow. The combinations can be given either to calves or pregnant cows. The combination vaccines provide protection for the newborn calf, via colostral and/or milk antibodies. In addition, protection against both agents can be developed by immunizing the pregnant cow with the inactivated reovirus-like vaccine and then administering the attenuated coronavirus-like vaccine to the calf. Protection against both agents can also be obtained by immunizing the pregnant cow with the inactivated coronavirus-like vaccine and then administering the attenuated reovirus-like vaccine to the calf. Finally, a combination vaccine comprising attenuated coronavirus and reovirus-like agents can be given to the pregnant cow.

The attenuated virus vaccine was tested for effectiveness by administering the vaccine produced at various cell culture passage levels to gnotobiotic calves at the age of about 7 hours. At a later time the calves were challenged by inoculation with virulent virus. The results of these tests are summarized in Table 1.

Calf 1 inoculated orally with 10 ml of cell culture fluid from the 14th passage of the virus on secondary fetal bovine kidney cells developed diarrhea and recovered. At 9 days of age, the calf was inoculated orally with 10 ml of diarrheal feces (virulent virus) in 20 ml PBS and remained normal. Calf 2, inoculated with 10 ml of 15th passage of virus on secondary fetal bovine kidney did not develop diarrhea and remained normal after it was given challenge inoculum of virulent virus. Calves 3 and 4 inoculated with 10 ml of 16th passage virus grown on secondary fetal bovine kidney cells developed mild diarrhea. Calf 3 was killed shortly after the onset of diarrhea; sections of the small intestine and colon stained with conjugate for the coronavirus-like agent had immunofluorescence in the epithelium of the intestinal villi and colon. Calf 4 inoculated with virulent virus in diarrheal feces when 6 days old remained normal. Calf 6 inoculated orally with 5 ml of 19th passage virus grown on secondary fetal bovine kidney cells developed diarrhea. Twelve calves (No. 7 through 13 and 15 through 19) inoculated orally with 5 ml of 13th to 25th passage virus of which at least 5 passages were on higher passages of fetal bovine cells did not develop diarrhea and, except for calf 18, remained normal after oral inoculation with feces containing virulent virus.

A combination vaccine containing inactivated coronavirus and reovirus was evaluated in adult calves from 2 ranches. The vaccine was prepared from 27 passage coronavirus, inactivated with formalin, and 201 passage (primary bovine kidney and bovine kidney cell line), reovirus, inactivated with formalin. The inactivated viruses were mixed together in equal amounts and aluminum hydroxide gel was added to 10%.

TABLE 1[a]

| Calf No. | No. of Virus Passages[b] | Result of Virus Inoculation | Result of Challenge Inoculation | Age of Calf (Days) |
|---|---|---|---|---|
| 1 | 14 + 0 | D | N | 9 |
| 2 | 15 + 0 | N | N | 3 |
| 3 | 16 + 0 | d | killed | — |
| 4 | 16 + 0 | d | N | 6 |
| 5 | Control for challenge virus | — | D | 3 |
| 6 | 19 + 0 | D | not challenged | — |
| 7 | 5 + 8 | N | N | 4 |
| 8 | 6 + 7 | N | N | 3 |
| 9 | 9 + 5 | N | N | 3 |
| 10 | 8 + 9 | N | N | 3 |
| 11 | 9 + 7 | N | N | 3 |
| 12 | 11 + 8 | N | N | 4 |
| 13 | 11 + 9 | N | N | 5 |
| 14 | Control for challenge virus | — | D | 3 |
| 15 | 11 + 11 | N | N | 4 |
| 16 | 10 + 11 | N | N | 3 |
| 17 | 10 + 12 | N | N | 3 |
| 18 | 10 + 15 | N | d | 4 |
| 19 | 10 + 13 | N | N | 4 |

[a]D = diarrhea; N = normal
[b]Passages on primary or secondary cells and passages on passaged cells

TABLE 2

| | | No. of Cows | No. of calves treated for scours | % treated |
|---|---|---|---|---|
| Ranch No. 1 | | 242 vaccinated twice | 3 | 1% |
| | | 85 unvaccinated | 77 | 91% |
| Ranch No. 2 | (a) | 600 vaccinated twice (400 calved in shed where bacterial infection was found; | 104 | 26% |
| | | 200 calved outside of shed) | 10 | 5% |
| | (b) | 350 vaccinated once | 17 | 5% |
| | | 1300 unvaccinated | 195 | 15% |
| | (c) | 750 vaccinated twice | 7 | 1% |
| | (d) | 250 vaccinated twice | 3 | 1% |
| | | 250 unvaccinated | 25 | 10% |

We claim:
1. A process for attenuating a coronavirus-like calf diarrhea virus comprising passaging said virus from five to about 60 times in tissue culture which supports the growth of the virus until the virus, when inoculated into newborn calves, prevents the development of disease upon subsequent challenge with virulent virus.

2. The process of claim 1 in which the passages are in a tissue culture of fetal bovine kidney cells at 30°–40°.

3. The process of claim 2 in which the total passages are 10–40 of which 5–10 passages are in primary or secondary fetal bovine kidney cell cultures and the remainder are in higher passaged fetal bovine kidney cell cultures.

4. A process for preparing a further quantity of attenuated coronavirus-like calf diarrhea virus comprising further growth of an attenuated coronavirus-like calf diarrhea virus in fetal bovine kidney cell culture, said further growth being for a length of time sufficient to permit growth of a larger amount of said virus and then harvesting the resultant viral material.

* * * * *